US010228762B2

(12) United States Patent
Smith et al.

(10) Patent No.: US 10,228,762 B2
(45) Date of Patent: Mar. 12, 2019

(54) ANALYSIS OF USER INTERFACE INTERACTIONS WITHIN A VIRTUAL REALITY ENVIRONMENT

(71) Applicant: Adobe Systems Incorporated, San Jose, CA (US)

(72) Inventors: Kevin Smith, Lehi, UT (US); William Brandon George, Pleasant Grove, UT (US)

(73) Assignee: Adobe Systems Incorporated, San Jose, CA (US)

( * ) Notice: Subject to any disclaimer, the term of this patent is extended or adjusted under 35 U.S.C. 154(b) by 60 days.

(21) Appl. No.: 15/402,667

(22) Filed: Jan. 10, 2017

(65) Prior Publication Data

US 2018/0196502 A1 Jul. 12, 2018

(51) Int. Cl.
*G06F 3/01* (2006.01)
*G06F 3/0481* (2013.01)

(52) U.S. Cl.
CPC ............. *G06F 3/012* (2013.01); *G06F 3/017* (2013.01); *G06F 3/04815* (2013.01); *G06F 3/013* (2013.01)

(58) Field of Classification Search
None
See application file for complete search history.

(56) References Cited

U.S. PATENT DOCUMENTS

2015/0016777 A1* 1/2015 Abovitz ............... G02B 27/225
385/37

* cited by examiner

*Primary Examiner* — Gustavo D Polo
(74) *Attorney, Agent, or Firm* — Kilpatrick Townsend & Stockton LLP

(57) ABSTRACT

The disclosure describes systems and methods of analyzing interactions with a user interface for an application, where the user interface is implemented at least partly within a virtual reality environment. Certain embodiments provide for receiving interactions that include gestures, spatial contexts, and applications contexts, and receiving results from the application, such as application behavior or error conditions. The user interface interactions and the application results are analyzed. Events, metrics, and relationships are determined based on the analysis. In some cases, additional data (such as historical interactions and results, system environment data, or system configuration data) are received and analyzed, and the determined relationships are further based on the additional data.

20 Claims, 7 Drawing Sheets

ANALYSIS OF USER INTERFACE INTERACTIONS WITHIN A VIRTUAL REALITY ENVIRONMENT

TECHNICAL FIELD

This disclosure relates generally to the field of virtual reality, and more specifically relates to collection and analysis of data within a virtual reality interface.

BACKGROUND

Virtual reality ("VR") is becoming a ubiquitous part of daily computing environments. Advances in both hardware and software allow applications to more commonly include VR elements. However, advances that allow an application to use virtual reality elements could also result in a user becoming dissatisfied with the application.

For example, an application could have a library of "expected" interactions, which are mapped to particular functions of the application. Current solutions to analyze user interfaces within VR environments may include predefined libraries of such expected interactions. An example of an expected interaction could be tilting one's head to the left. However, some users initially feel awkward using VR interface elements, and perform interactions in a manner different from the expected interaction, for example, by rotating one's head instead of tilting as expected by the library. In addition, users often unconsciously perform "extra" gestures. Such extra gestures could feel very natural to the user, but be different from the library of expected interactions, and could interfere with the intended function of the application. Thus, the use of pre-defined libraries of expected interactions is insufficient for understanding how users will naturally and unconsciously interact with the VR interface.

An application's user interface ("UI") depends on the ability of VR elements in the interface to accurately and quickly reflect the user's intent, without frustrating or confusing the user. Thus, improving a user experience within a virtual reality environment will require accurate analysis of how users interact with an application UI within a VR environment, and how the applications respond to users' interactions. In addition, improving an application's response to unexpected interactions requires analysis and identification of such unexpected or extra interactions. Improving the availability of analysis tools specific to interactions within a VR environment improves a user experience within a VR environment, reducing frustration of the user and improving accuracy and responsiveness of the application UI.

SUMMARY

Embodiments are disclosed for providing techniques for collecting, correlating, and analyzing user interactions with an application user interface within a virtual reality environment, so as to provide analytical tools for better understanding relationships between the user interactions and the application functionality.

According to certain embodiments, a user interacts with a user interface ("UI") within a virtual reality ("VR") environment. The UI provides input to an application that is displayed within the VR environment. The UI interactions within the VR environment include one or more of gestures (such as motions performed by the user), a spatial context (such as the user's physical location relative to VR detection equipment), or an application context (such as a certain view or behavior of the application). Each interaction is associated with the application's response to the interaction with the UI. In some cases, the response is one or more of an intended output of the application, an unintended output of the application, an error condition, or no change to the function of the application.

In some embodiments, a data collection module receives data describing the UI interactions, including gestures, spatial contexts, or application contexts. Additionally or alternatively, the data collection module receives data describing a result of the application. In some cases, the described result is associated with the described UI interactions, or the application response, or both.

In some embodiments, the received data are provided to an analytical module, which determines relationships between the results and the described UI interactions. In some cases, the analytical module receives additional interactions (such as historical interaction data stored on a database), and relationships are determined between the described UI interactions and the additional interactions. For example, the described UI interactions and the additional interactions share characteristics, such as a particular gesture. In some cases, the interactions are also related with results, such as an intended output of the application.

In some embodiments, the received data or determined relationships are presented, such as by providing a report. For example, a display device is configured to present a report including the interactions, results, and determined relationships. In some cases, presenting the received data and determined relationships facilitates comprehension of the analysis, such as by a software developer or user experience specialist.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings, where.

DETAILED DESCRIPTION

Figure 1:
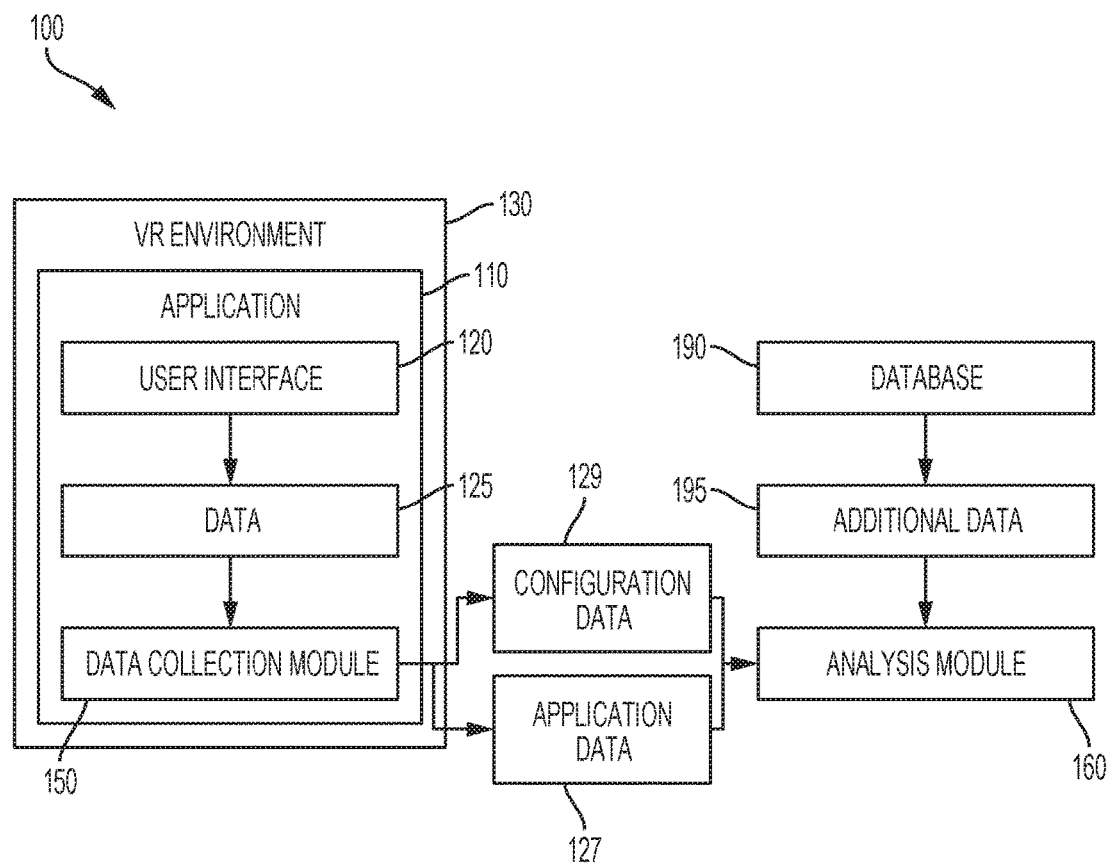
FIG. 1 is a block diagram depicting an exemplary environment for collection and analysis of data within a virtual reality ("VR") interface, according to certain embodiments.

As discussed above, prior techniques for pre-defining a library of expected interactions within a virtual reality ("VR") environment do not provide adequate accurate analysis of how users naturally interact with an application user interface ("UI") in the VR environment. In addition, such prior techniques do not provide for identification of unexpected or extra interactions. Certain embodiments described herein provide techniques for analyzing interactions with applications via a UI that is implemented within a VR environment, and results that are associated with the responses to the interactions by the applications.

The following examples are provided to introduce certain embodiments of the present disclosure. In this example, a user interacts with a UI that is at least partially implemented within a VR environment. The UI provides input to an application that is displayed within the VR environment. The UI interactions within the VR environment include one or more of gestures, spatial contexts, or application contexts. Each UI interaction is associated with one or more responses by the application to the interaction (e.g., an intended output of the application, an unintended output of the application, an error condition, or the absence of a change to the function of the application, etc.).

Continuing with this example, a data collection module receives data describing the UI interactions, including gestures, spatial contexts, or application contexts. Additionally or alternatively, the data collection module receives data describing a result that is associated with the described UI interactions, or the application response, or both. In some embodiments, the received data are provided to an analytical module, which determines relationships between the described results and the described UI interactions, such as a group of interactions related with an intended output of the application. In some cases, the analytical module identifies an event, such as a group of interactions that often occur together, or a metric, such as an attribute of an interaction.

As a non-limiting example, while viewing a webpage in a browsing application, a user could tilt her head to the left to access a "back" function of the browser (e.g., navigating to a previous page). The data collection module receives data describing the interactions, including the head-tilt gesture and the browsing application context. The data collection module also receives data describing the results of the interactions (e.g., whether the browser correctly navigated to the previous page). The received data are provided to the analytical module, which determines a relationship between the head tilt and a successful navigation to the previous page.

In some embodiments, the received data or determined relationships are presented, such as by providing a report. For example, a display device is configured to present a report including the interactions, results, and determined relationships. In some cases, presenting the received data and determined relationships facilitates comprehension of the analysis, such as by a software developer or user experience specialist. In some embodiments, a presented report includes recommendations, such as a recommendation to collect data related to an identified event.

As used herein, the terms "virtual reality" or "virtual reality environment" refer to a computing environment that is wholly or partially included in a virtual space (e.g., a perceived space that is not embodied by physical components). A virtual reality environment is implemented by any suitable combination of hardware or software, including (without limitation) cameras, projectors (e.g., simulated display projected onto eyewear), accelerometers, pressure switches, sensors worn by the user (e.g., head position sensors), emitters worn by the user (e.g., gloves with light-emitting diodes), or any other suitable device or module. In some cases, a VR environment includes non-virtual components. For example, a computing environment that includes both physical components (e.g., a keyboard and display) and virtual components (e.g., additional projected displays and a cursor enabled by eye-tracking) is considered as a VR environment herein, unless otherwise indicated.

As used herein, the terms "user interface" and "UI" refer to a collection of components that are associated with an application and that allow the application to receive inputs from a user and provide outputs to a user. In some embodiments, a user interface is implemented in either a VR environment, a physical environment, or both. In some embodiments, a user interface receives inputs from a user from components such as (without limitation) a keyboard, a mouse, a touchscreen, a microphone, a light or laser pointer, wearable sensors, software components implemented in a VR environment, or any other suitable components or combination of components. In some embodiments, a user interface provides outputs to a user from components such as (without limitation) a display screen, a touchscreen, wearable display devices (e.g., display glasses, wrist-mounted display), a projector, speakers, earphones/ear pieces, wearable sensors, software components implemented in a VR environment, or any other suitable components or combination of components.

As used herein, the terms "user interface interaction" or "interaction" refer to inputs or outputs provided or received by a user of a computing system. In some embodiments, the interaction with the UI is virtual, such as gestures manipulating a virtual control (e.g., a virtual steering wheel). In additional or alternative embodiments, the interaction with the computing system is non-virtual, such as user input to a physical component (e.g., a keyboard or mouse). In some cases, interactions with the computing system include the user receiving output, such as viewing output on a display. Unless otherwise indicated, "interactions" include one or more of interactions with virtual components, interactions with non-virtual components, or any combination thereof. In some embodiments, interactions include one or more of gestures, spatial contexts, or application contexts.

As used herein, the term "gesture" means a motion performed by a user to provide an input to a computing system. In some embodiments, gestures include (without limitation) position or motion of the head, eyes, hands, limbs, torso, or body; facial expressions or body language; audible signals (e.g., voice commands or natural speech recognition); attention tracking (e.g., gaze tracking or head angle tracking); or natural language processing (e.g., sign language).

As used herein, the term "spatial context" means a context within the user's physical surroundings. In some embodiments, spatial contexts include (without limitation) physical location (e.g., located centrally, located to one side), position (e.g., standing, seated, crouching), or aspect (e.g., facing, turned away). In some cases, the spatial context is relative to the virtual reality detection apparatus, such as cameras, motion sensors, microphones, or other appropriate sensors. Additionally or alternatively, the spatial context is relative to a previous spatial context of the user, or to a typical spatial context of the user. In some cases, a typical spatial context is indicated by the user, or determined based on a history, or both.

As used herein, the term "application context" means a context within the computing system environment. In some embodiments, application contexts include (without limitation) a window, a desktop, a layer in a set of virtual workspaces, a user identity or profile, a displayed input point (e.g., position of a cursor), a relative or absolute position in an application environment (e.g., a document location on a network, a simulated position in a game). In some cases, an application context includes operations performed by the application, such as maintaining a network connection or responding to a user command. In some cases, an application context is a virtual context, such as displaying a particular area of a virtual workspace. Additionally or alternatively, an application context has a physical component, such as performing an operation using a particular hardware component.

As used herein, the term "result" means a behavior or a state produced by an application. The application could operate within the VR environment, within the computing system, or both. In some embodiments, a result includes (without limitation) an intended response (e.g., application or system behavior desired by the user); an unintended response (e.g., a mistake); an error state, including failure of an application, the VR environment, or the computing system; a "non-result," such as no change to the operation of the application, or any other suitable behavior. In some cases, a result is different from other results based on a particular combination of a gesture, a spatial context, and an application context. In some embodiments, a result has an efficacy that describes how closely the result matches the application or system behavior desired by the user.

As used herein, the terms "event" and "composite event" refer to a discrete UI interaction that is repeatable by multiple users. A composite event is a set (or group) of discrete interactions. For example, an exemplary composite event Head_Roll_Right includes the set of gestures Head_Tilt_Right, Head_Tilt_Back, Head_Tilt_Left, and Head_Center. In some cases, a composite event includes the same UI interaction repeated multiple times. Additionally or alternatively, events are identified with respect to any type of interaction or combination of interaction types. For example, an identified event combines a gesture with a spatial context, such as tilting the head to one side while leaning forward. In some cases, known events or known composite events are included in a library, such as a library accessible by an analysis system.

As used herein, the term "metric" means a measurement of an attribute of a UI interaction, result, or both. In some embodiments, a metric includes (without limitation) an elapsed time to perform an interaction, a physical angle or displacement of an interaction, an intensity (e.g., volume of an audible gesture), a success rate (e.g., a frequency of an intended result), a failure rate, a correction rate, or any other suitable metric. In some cases, a metric has a particular value that is associated with a particular interaction or result. For example, a displacement metric has a first value of 30° associated with the first interaction and a second value of 45° associated with a second interaction. In some cases, a metric indicates an absolute measurement of an attribute (e.g., coordinates of a gesture in a virtual space). Additionally or alternatively, a metric indicates a relative measurement of an attribute (e.g., a displacement of a spatial context relative to a previous spatial context). In certain embodiments, a metric measures another metric, or is based on another metric, or both. For example, a frequency metric indicates how often a displacement metric exceeds 30°. In some cases, known metrics are included in a library, such as a library accessible by an analysis system.

As used herein, the term "report" refers to providing information regarding user interactions with a VR system, such as information determined by various techniques and operations described herein. In some cases, a report includes information regarding UI interactions, results, metrics, a physical environment of a VR system, a computing configuration of a VR system, or any other suitable information. A report is provided in a form perceivable by a person (such as a display on a display device), or a computing system (such as a file provided by a database), or any other suitable form.

Referring now to the drawings, FIG. 1 is a diagram of an exemplary environment 100 in which one or more embodiments of the present disclosure are practiced. The environment 100 includes an application 110 with a user interface 120. The user interface 120 is at least partially implemented within a virtual reality environment 130. FIG. 1 depicts the application 110 and the user interface 120 as included within the VR environment 130, but other implementations are possible. For example, the VR environment is operated as a process of the application 110. The environment 100 also includes a data collection module 150 and an analysis module 160. FIG. 1 depicts the data collection module as included in application 110, but other implementations are possible. For example, the data collection module is included within the analysis module.

In an embodiment, a user of the application 110 interacts with the application via the UI 120. The UI interactions are performed within the VR environment 130. In some cases, the UI interactions include a gesture, such as a head nod or pointing in a direction. Additionally or alternatively, the UI interactions include a spatial context, such as the user stepping to one side in the physical environment. Additionally or alternatively, the UI interactions include an application context, such as performing an interaction while the UI displays a particular view or menu, or while the application is performing a certain function (e.g., downloading a large file). In some cases, the UI 120 includes components or interaction techniques that are non-virtual (e.g., inputs to a keyboard), and the user performs UI interactions via the non-virtual components.

In some embodiments, the UI interactions are associated with results from the application. For example, a result is one or more of an intended response of the application, an unintended response of the application, an error condition, or no change to the function of the application. In some cases, the result occurs based on a combination of the UI interactions.

A data collection module 150 receives data 125 describing the UI interactions, application results, or both. In some cases, the data collection module 150 correlates the received data 125 into groups, such as by time or type. For example, the data collection module 150 correlates results with UI interactions, based on the results and UI interactions occurring within a period of time, in a sequence, or both. Additionally or alternatively, the data collection module 150 correlates the received data 125 based on component types, such as a group of UI interactions that each include head-tilting gestures or keyboard input, and related results. Additionally or alternatively, the data collection module 150 correlates the received data 125 based on results, such as a group of results that each include an error condition, and related UI interactions. In certain embodiments, the data collection module 150 provides the received data 125 to the analysis module 160 without correlating some or all of the data. In certain cases, an interaction or a result belongs to zero, one, or more than one group.

An analysis module 160 receives, from the data collection module 150, the application data 127. The application data includes described interactions, or described results, or both. Additionally or alternatively, the analysis module 160 accesses a data source, such as database 190, and receives additional data 195 from the data source. The database 190 includes additional interactions, or additional results, or both (e.g., historical interaction or result data).

In an embodiment, the analytical module 160 analyzes UI interactions described by the application data 127, or the additional data 195, or both. In some cases, the analytical module 160 determines that the described interactions and the additional interactions share characteristics. For example, described interactions and additional interactions share a particular gesture, spatial context, or application context. Additionally or alternatively, the analytical module 160 determines that interactions are related by described results, additional results, or both. For example, described interactions and additional interactions are determined to be related to an intended response of the application. In some cases, the analytical module 160 determines a group of interactions based on described interactions, additional interactions, or both, that share characteristics.

In some embodiments, the analytical module 160 determines events, or metrics, or both based on shared characteristics within groups of interactions. For example, the analytical module 160 determines an event based on a group, where the determined event is a common combination of interactions, such as a gesture that is frequently correlated with a spatial context. Additionally or alternatively, the analytical module 160 determines a metric based on a group, such as an average time duration of head-nod gestures. In some cases, an event, a metric, or both are identified in a pre-existing library (e.g., an event library). Additionally or alternatively, the analytical module 160 determines an event, metric, or both, that are not previously identified.

The identification of events and metrics is based one or more of the received data, the additional data, or the determined relationships. For example, an event is identified based on a determination that a gesture of lowering the head often occurs with a gesture of raising the head. This identified event is assigned an identification, such as "head nod." Additionally or alternatively, a metric is identified based on a determination that a "head nod" gesture has certain attributes that occur across multiple instances of head nods, such as a such as an average time duration or an angle of inclination.

In some embodiments, the analytical module 160 determines a relationship between results and UI interactions with the application 110. For example, the analytical module 160 determines a relationship between a group of interactions having a shared characteristic, and intended application responses. In some cases the determined relationship includes correlating a shared characteristic with a change in the efficacy of the result. For example, the analytical module 160 determines that interactions including (or lacking) a particular gesture are correlated with an intended application response. Additionally or alternatively, the analytical module 160 determines that interactions lacking (or including) a particular gesture are correlated with an unintended application response.

In some cases, the analytical module 160 receives information describing non-virtual interactions with the user interface 120, such as inputs to a physical keyboard and mouse, or an application context displayed on a physical display device. The information describing the non-virtual interactions is included with other information, such as with application data 127, or received separately, or both. In some cases, a relationship is determined between application results, virtual UI interactions, and the described non-virtual interactions.

In some cases, the analytical module 160 receives configuration data 129 describing information related to the configuration of the application 110, the user interface 120, the VR environment 130, or any combination of these. In some cases the configuration data 129 includes information describing the configuration of one or more computing systems (not depicted in FIG. 1) on which one or more of the application 110, UI 120, or VR environment 130 operate. The configuration data 129 is correlated with the data 125, with a group of interactions, or with any other suitable set of data. In some cases, a relationship is determined between application results, UI interactions, and the described configuration information. For example, the analytical module 160 correlates configuration information related to a component of the VR environment 130 with application results and interactions having a particular spatial context. The analytical module 160 determines a relationship between the VR component and the spatial context (e.g., a camera component is related to detecting a user's body position). Additionally or alternatively, the analytical module 160 determines that the relationship between the VR component and the spatial context is correlated with a change in the efficacy of the result (e.g., a higher frequency of intended application responses is related to a particular version of VR software).

In some cases, the analytical module 160 receives environmental data describing information related to the physical environment of the application 110, the user interface 120, the VR environment 130, or any combination of these. For example, the analytical module 160 receives environmental data describing a light source located behind the user. The environmental data is included with other information, such as with configuration data 129, or received separately, or both. In some cases, a relationship is determined between application results, UI interactions, and the described environmental information.

The analytical module 160 is configured to provide information describing one or more of the determined relationships, events, metrics, or correlations. For example, the analytical module 160 configures a display device to display a report describing relations between gestures, spatial contexts, and results including error conditions.

In some embodiments, relationships are determined between one or more sets of received data. For example, a relationship is determined between application data 127 received from the data collection module 150, additional data 195 received from the database 190, or any other suitable set of data. Additionally or alternatively, a relationship is determined based on a correlation between groups of interactions, or between interactions within a group. Additionally or alternatively, a relationship is determined between any combination of one or more of: a gesture, a spatial context, an application context, a result, an interaction (including virtual interactions, non-virtual interactions, or both), an event, a metric, configuration data, environmental data, or any other suitable received data. In some embodiments, the determined relationship indicates an efficacy of a result, or a change in efficacy of a result.

Figure 2:
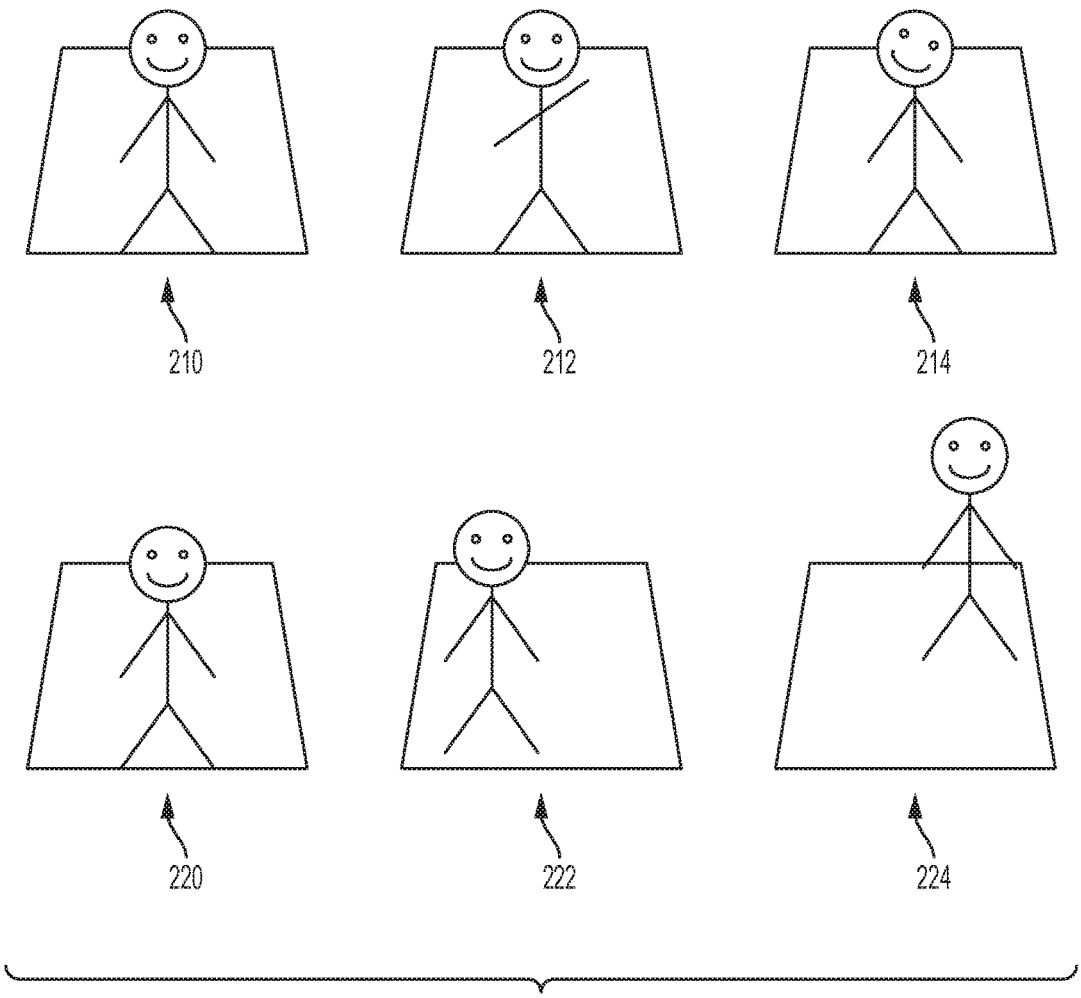
FIG. 2 is a diagram depicting exemplary gestures and spatial contexts via a VR interface, according to certain embodiments.
Figure 3:
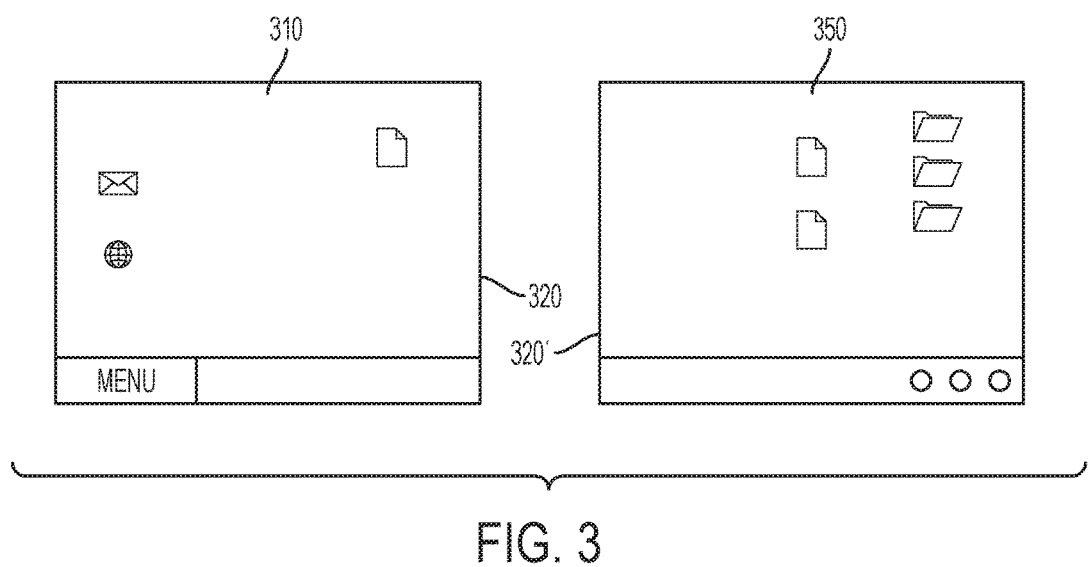
FIG. 3 is a diagram depicting exemplary application contexts in a VR environment, according to certain embodiments.

FIGS. 2-3 are diagrams of exemplary interactions that are performed in a virtual reality environment, such as VR environment 130. The interactions are performed via a user interface, such as UI 120. In some cases, an interaction includes one or more of a gesture, a spatial context, or an application context. In some cases, an interaction is determined by any suitable component of the VR environment or user interface, such as, without limitation, a camera, an accelerometer, a motion sensor, a pressure switch, a display, or other components.

FIG. 2 is a diagram of exemplary gestures and spatial contexts. A gesture is performed by a user. A gesture includes one or more of (without limitation) eye movement, head movement, motion of arms or legs, hand motions (e.g., sign language), or motion of the body. For example, gestures performed by the user include any of a neutral position 210, an arm movement 212, or a head tilt 214. A user could use a gesture to interact with a VR environment, for example, by nodding downwards to pause a video application.

A spatial context is provided by the user. A spatial context includes a location of the user or a location of a gesture performed by the user. Additionally or alternatively, a spatial context includes one or more of the user's body location (e.g., centered, standing to one side, more distant), or the user's body position (e.g., standing, seated, facing a display, turned sideways). In some cases, the spatial context is relative to a component of the computing system or the VR environment (e.g., centered, more distant, less distant). For example, relative to a camera component, the spatial context includes a central location 220, an offset location 222, or a more distant location 224. A user could use a spatial context interact with a VR environment, for example, by stepping backwards to minimize an application window.

FIG. 3 is a diagram of exemplary application contexts. An application context is provided by the application. For example, the application context includes a first view 310, comprising a work area capable of receiving inputs (e.g., a desktop). The first view 310 includes a first edge 320. In some cases, the application context is provided based on an interaction received from the user (including interactions via physical input components). For example, the view 310 is provided responsive to a spatial context of the user, such as the central location 220 described in FIG. 2. The application context is modified based on an interaction received from the user. For example, if an additional interaction is received, such as the user moving to the offset location 222, the application context is modified to include a second view 350. The modification of the application context includes an apparent transition across first edge 320, such that the first edge 320 on a right side of view 310 transitions to a second edge 320' on a left side of second view 350.

In certain embodiments, a user providing the same gesture or spatial context receives different results based on different application contexts. For example, a hand-swipe gesture performed by a user accesses a scroll function when associated with a word-processing application context, and accesses a volume function when associated with an audio playback application.

In some cases, the application context includes instructions received or performed by the application, such as instructions received from another application or from the user. For example, the application context includes a downloading action of the application. Additionally or alternatively, the application context includes operating conditions of the application, such as operation on a computing system on which other applications are also running.

In some cases, UI interactions, such as those described in relation to FIGS. 2-3, are correlated with other data relating to the computing system or the physical environment of the VR system. For example, a camera component in a VR environment detects information about the physical environment of the VR system (e.g., a strong light source behind the user). Data describing the physical environment (e.g., a position or intensity of the light source) is provided, such as to analytical module 160. Additionally or alternatively, the computing system provides information about components of the computing system, including components related to the VR environment. For example, the computing system provides data describing software (e.g., an operating system type, an application version number), or hardware (e.g., a camera model, a sensor calibration), or both. The data describing the components is provided, such as to analytical module 160. In some cases, relationships between application results and user interactions are determined based in part on the data relating to the computing system or the physical environment of the VR system. For example, the analytical module determines a relationship between unintended results and a specific model of sensor used to determine gestures.

Determining Events and Metrics

In some embodiments, the analytical module, such as analytical module 160, determines an event based on multiple UI interactions. Additionally or alternatively, the analytical module determines a metric based on multiple UI interactions. The determined event or metric is based on (without limitation) combinations of interactions, characteristics shared by interactions, results or metrics associated with the interactions, or additional data associated with interactions. In some cases, the determined event or metric is identified in a pre-existing library. Additionally or alternatively, the determined event or metric is a previously unknown event or metric, or is associated with an unexpected UI interaction or result. For example, a user of a VR system performs a particular gesture in a particular application context, such as leaning forward towards a display while performing a zoom command. The application may lack programming to interpret the gesture in the application context, but the user consciously or unconsciously performs the gesture while in that application context, and ceases the gesture when no longer in the application context, such as leaning back when a zoom command is complete.

In an embodiment, the analytical module determines an event or metric based on data describing a group of UI interactions. The determined event or metric is based on a shared characteristic of the group of UI interactions. The shared characteristic includes a particular interaction associated with a particular metric, such as a head tilt gesture that has an angle of 30° to the left. Additionally or alternatively, the shared characteristic includes a particular group of interactions, such as a group of interactions that are performed together (e.g., in a sequence, concurrently) by the user. In some cases, the analytical module determines the event or metric based on data describing results, metrics, or additional data associated with the group of UI interactions. For example the analytical module determines an event including a facial gesture (e.g., a user frowning), based on associated results (e.g., an error or unintentional result).

In some embodiments, the determined event or metric is identified as a new event or a new metric. Additionally or alternatively, an indication of the identified new event or new metric is provided. For example, the analytical module compares a determined event (or metric) to a library of events and metrics. The analytical module determines whether the library includes an event that corresponds to the determined event. Based on the comparison to events included in the library (e.g., the library does not contain a corresponding event), the determined event is identified as a new event. Additionally or alternatively, the analytical module adds the new event to the library, or provides an indication of the new event (e.g., such as in a recommendation provided to a user), or both. In some cases, the provided indication includes additional information, such as information regarding associated results. For example, the indication includes the information that the new event or new metric is associated with error conditions. Additionally or alternatively, the indication includes a recommendation that the application receive programming (e.g., a software update) that allows the application to interpret the new event or new metric.

Determining Relationships Between UI Interactions and Results

In some embodiments, UI interactions are correlated with data describing one or more results. For example, an analytical module, such as analytical module 160, receives data describing multiple UI interactions with an application, and data describing multiple results associated with the UI interactions. In some cases, the analytical module receives historical data (e.g., data stored on a database) describing additional UI interactions and additional results with the application, or similar applications (e.g., different instances of a same application, different versions of a same application, different applications having similar types). Additionally or alternatively, the analytical module receives additional data, such as data describing a computing system configuration or a physical environment.

In some cases, the analytical module receives data describing one or more metrics associated with one or more of the UI interactions, the results, or the additional data. For example, the metrics comprise a success metric of 30% (e.g., the results were successful 30% of the time). Additionally or alternatively, the metrics comprise a repetition metric (e.g., how often a user repeated the UI interactions), a reversal metric (e.g., how often a user attempted to undo the result), or any other suitable metric describing the UI interactions, the results, or the additional data. In some cases, the analytical module receives the data describing the metrics from a remote source, such as a database or an additional computing system. Additionally or alternatively, the analytical module determines the metrics, and receives the data via this determination.

In some embodiments, the analytical module determines a relationship based on one or more of the UI interactions, the results, or the metrics. For example, the analytical module receives data describing UI interactions with an application (e.g., a browsing application), and data describing results and metrics associated with the UI interactions. A first group of the UI interactions is associated with a first group of the results, and the metrics indicate that the first group of results has a success metric of 30%. In some cases, the first group of UI interactions has a shared characteristic. For example, each UI interaction in the first group shares a particular characteristic that is common among all interactions in the first group. The shared characteristic includes (without limitation) a particular gesture, spatial context, or application context; a combination of interactions, such as a particular gesture that is paired with a particular application context; an order of interactions, such as a particular gesture that follows a particular spatial context; an additional metric that describes a particular interaction, such as a metric describing a particular attribute of a gesture (e.g., a duration of 20 ms); or any other suitable characteristic. In some cases, the shared characteristic includes multiple shared characteristics of the first group of UI interactions.

In an embodiment, the analytical module determines a relationship between the first group of UI interactions and the first group of results. In some cases, the relationship is based on the metrics associated with the first groups of UI interactions and results. For example, the relationship is determined based on the success rate of 30%, such as a relationship indicating that the first group of UI interactions has a successful result 30% of the time. Additionally or alternatively, the relationship is based on the shared characteristic of the first group of UI interactions. For example, if the first group of UI interactions has a shared characteristic of a head nod gesture, the determined relationship indicates that the first group of UI interactions having the head nod gesture has a successful result 30% of the time. In some cases, the relationship is based on a difference, such as a difference from a particular interaction, result, metric, or a shared characteristic.

In some cases, the analytical module determines a relationship between one or more of the UI interactions, the results, the metrics, or additional received data. For example, the UI interactions have a shared characteristic described by the additional data, such as an attribute of a computing system configuration or a physical environment of the VR system. Additionally or alternatively, the relationship is based on the shared characteristic described by the additional data. For example, the analytical module receives additional data describing the configuration and environment of the VR system where the first group of UI interactions are performed. The analytical module determines a relationship between the first group of UI interactions and the first group of results based on the additional data. The relationship indicates that UI interactions performed using a particular camera model have a successful result 80% of the time. Additionally or alternatively, the relationship indicates that UI interactions performed in an environment with a bright light source behind the user have a successful result 20% of the time.

In some embodiments, the determined relationship indicates a correlation between results and a change in value of an associated metric, based on a difference in UI interactions associated with the results. Additionally or alternatively, the determined relationship is based on a difference in additional data associated with the results.

For example, the analytical module receives data describing UI interactions with an application, and data describing results and metrics associated with the UI interactions. A first group of the UI interactions is associated with a first group of the results, and the associated metrics indicates that the first group of results has a success metric of 30%. A second group of the UI interactions is associated with a second group of the results, and the associated metrics indicates that the second group of results has a success metric of 75%.

The analytical module determines a first relationship between the first and second groups of UI interactions, and the first and second groups of results. The relationship indicates that a change in the value of the metric is correlated with a difference between the first and second groups of UI interactions. For example, the analytical module determines that the first group of UI interactions lacks (or includes) a shared characteristic, and that the second group of UI interactions includes (or lacks) the shared characteristic. Additionally or alternatively, the analytical module determines that the first group of results has a first correlation with a decreased value of the success metric, and the second group of results has a second correlation with an increased value of the success metric. In some cases, the analytical module determines a relationship indicating that the increased value of the success metric is correlated with the presence (or absence) of the shared characteristic.

In some cases, a relationship indicating a change in value of a metric is determined based on additional data, such as data describing the configuration or environment of the VR system, historical data, such as data describing additional UI interactions or additional results, or any other suitable data.

Figure 4:
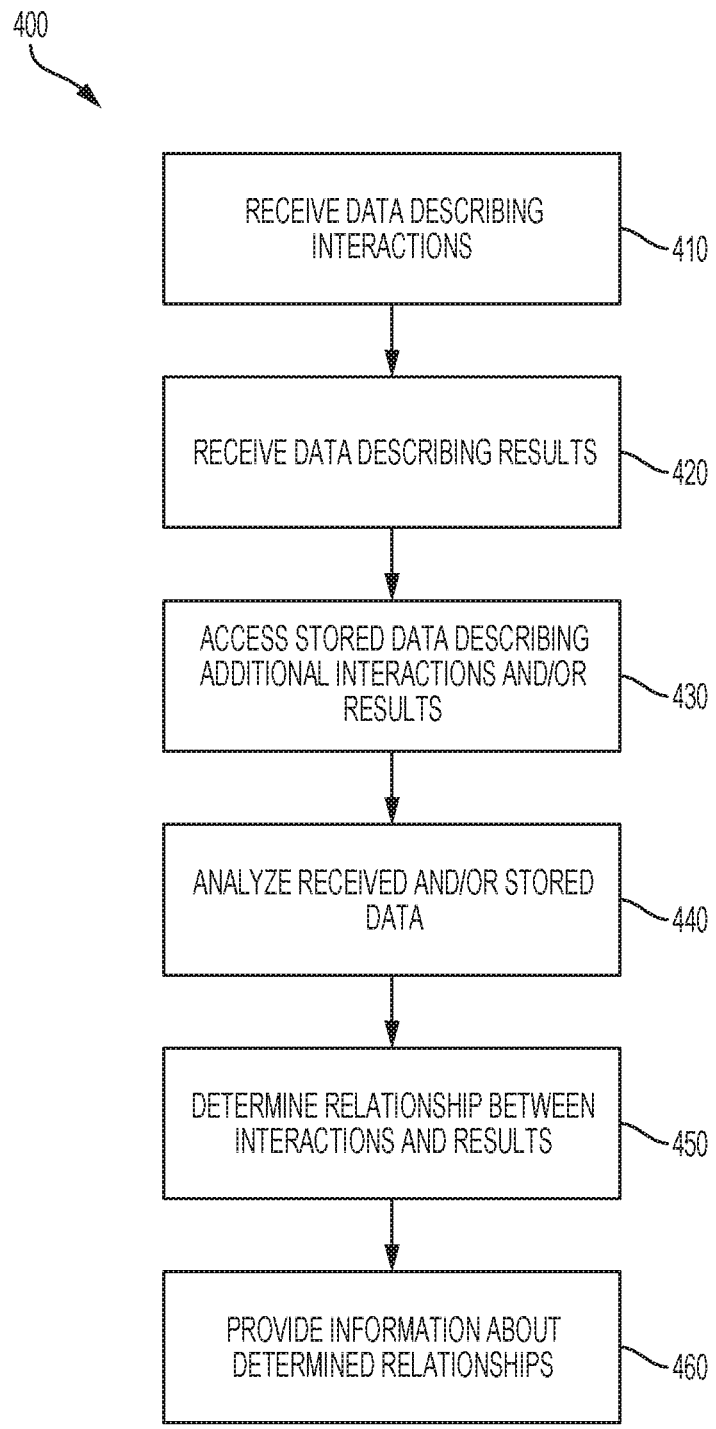
FIG. 4 is a flow chart depicting an example of a process for analyzing data received from a user interface in a VR environment, according to certain embodiments.

FIG. 4 is a flow chart depicting an example of a process 400 for analyzing data received from a user interface in a VR environment. In some embodiments, such as described in regards to FIGS. 1-3, a computing device executing an analysis module implements operations described in FIG. 4, by executing suitable program code. For illustrative purposes, the process 400 is described with reference to the examples depicted in FIGS. 1-5. Other implementations, however, are possible.

At block 410, the process 400 involves receiving data describing interactions with a user interface, such as user interface 120 as described in regards to FIGS. 1-3. In some embodiments, the described interactions include gestures, spatial contexts, or application contexts, as described elsewhere herein. In some cases, the received data further includes one or more of metrics, configuration data, or environmental data associated with the described interactions.

At block 420, the process 400 involves receiving data describing results, such as results from application 110 as described at least in regards to FIG. 1. In some cases, block 420 includes receiving metrics associated with the described results. The data describing results or metrics is received from any suitable source, such as from user interface 120 or database 190.

At block 430, process 400 involves accessing stored data, such as data stored on database 190. In some embodiments, the stored data includes one or more of additional UI interactions, additional results associated with the additional interactions, additional metrics, or additional data, as described at least in regards to FIG. 1. In some embodiments, operations related to block 430 are omitted.

In some embodiments, operations related to some, all, or none of blocks 410, 420, or 430 are performed by additional executed modules, such as by a data collection module 150.

At block 440, the process 400 involves analyzing one or both of the received data and the stored data. For example, the received UI interactions are correlated into groups, as described at least in regards to FIG. 1. Additionally or alternatively, the received data and the stored data are correlated based on results or shared characteristics, as described at least in regards to FIG. 1.

At block 450, the process 400 involves determining a relationship between the received UI interactions and the received results. Additionally or alternatively, the determined relationship is based on the received additional interactions or additional results. In some embodiments, the determined relationship is also based on metrics or additional data, as described above.

At block 460, the process 400 involves providing information describing the determined relationship. For example, information regarding the determined relationships is provided via a display device configured to display a report, as described at least in regards to FIG. 1.

Figure 5:
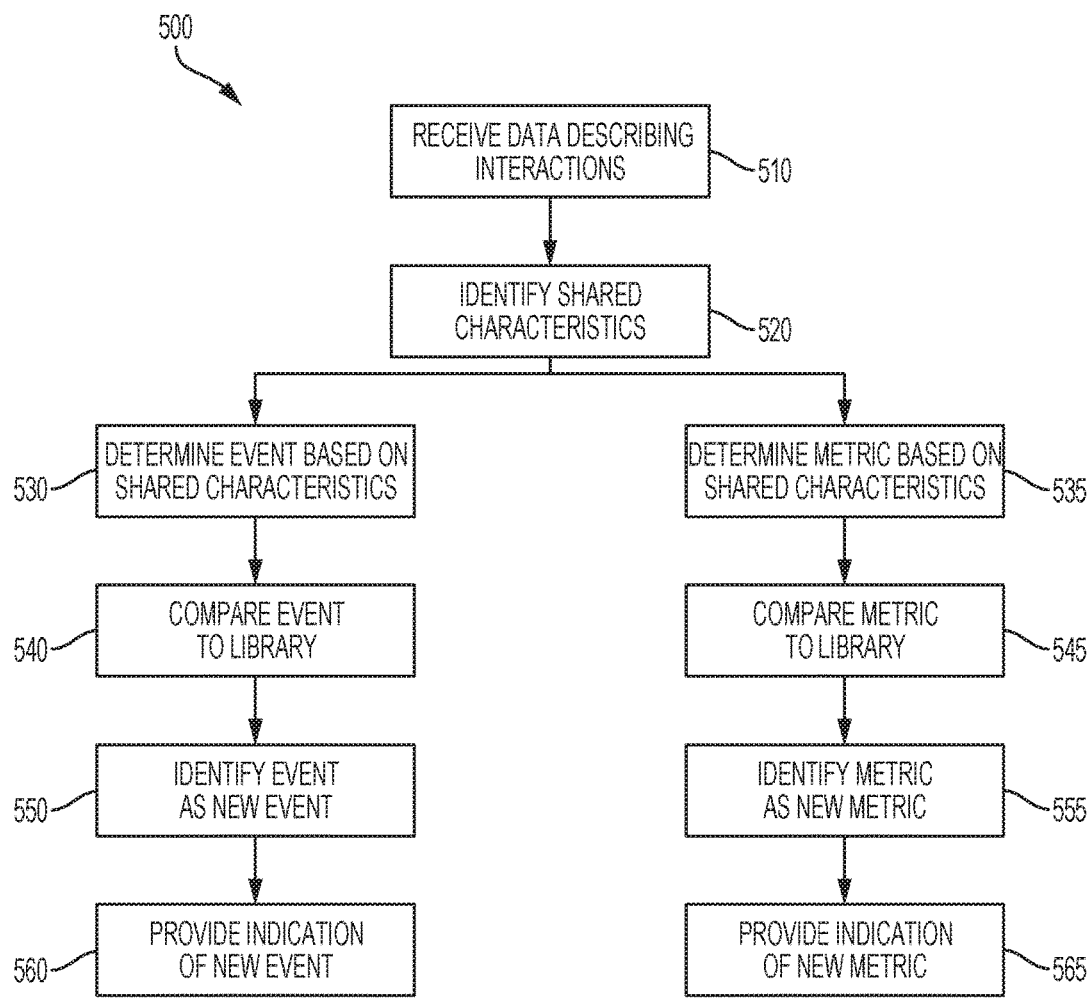
FIG. 5 is a flow chart depicting an example of a process for determining events or metrics associated with a VR environment, according to certain embodiments.

FIG. 5 is a flow chart depicting an example of a process 500 for determining events or metrics. In some embodiments, such as described in regards to FIGS. 1-4, a computing device executing an analysis module implements operations described in FIG. 5, by executing suitable program code. For illustrative purposes, the process 500 is described with reference to the examples depicted in FIGS. 1-4. Other implementations, however, are possible.

At block 510, the process 500 involves receiving data describing interactions with a user interface, such as user interface 120 as described in regards to FIG. 1. The data is received from any suitable source, such as from a data collection module 150 or a database 190. In some cases the received data could include results, metrics, or additional data associated with the described UI interactions.

At block 520, the process 500 involves identifying characteristics shared by the described UI interactions. Additionally or alternatively, block 520 includes operations related to identifying characteristics shared by the results, metrics, or additional data associated with the described UI interactions. For example, an identified shared characteristic includes a group of UI interactions having a result of an error condition, as described at least in regards to FIG. 1.

At blocks 530 and 535, the process 500 involves determining an event and determining a metric, respectively, based on the identified shared characteristics. In some cases, determining the event or determining the metric is further based on the results, metrics, or additional data associated with the described UI interactions.

At blocks 540 and 545, the process 500 involves comparing the determined event and comparing the determined metric, respectively, to a library. Blocks 540 and 545 include determining whether the library includes a corresponding event or metric, as described elsewhere herein. For example, the comparison indicates that the library does not include a corresponding event or metric.

At blocks 550 and 555, the process 500 involves identifying, respectively, that the determined event is a new event and the determined metric is a new metric. Identifying the new event or new metric is based on the comparison performed in relation to blocks 540 or 545. For example, a determined event is compared to events included in a library, as described in regards to block 540. Based on the comparison indicating that the library does not include a corresponding event, the determined event is identified as a new event.

At blocks 560 and 565, the process 500 involves providing an indication of the new event and the new metric, respectively. In some cases, the provided indication includes additional information about the new event or the new metric. The indication is provided via a report, such as a report displayed on a display device, or by any suitable method.

In certain embodiments, process 500 omits operations related to any of blocks 530, 535, 540, 545, 550, 555, 560, or 565. For example, an embodiment of process 500 determines events without determining metrics.

Figure 6:
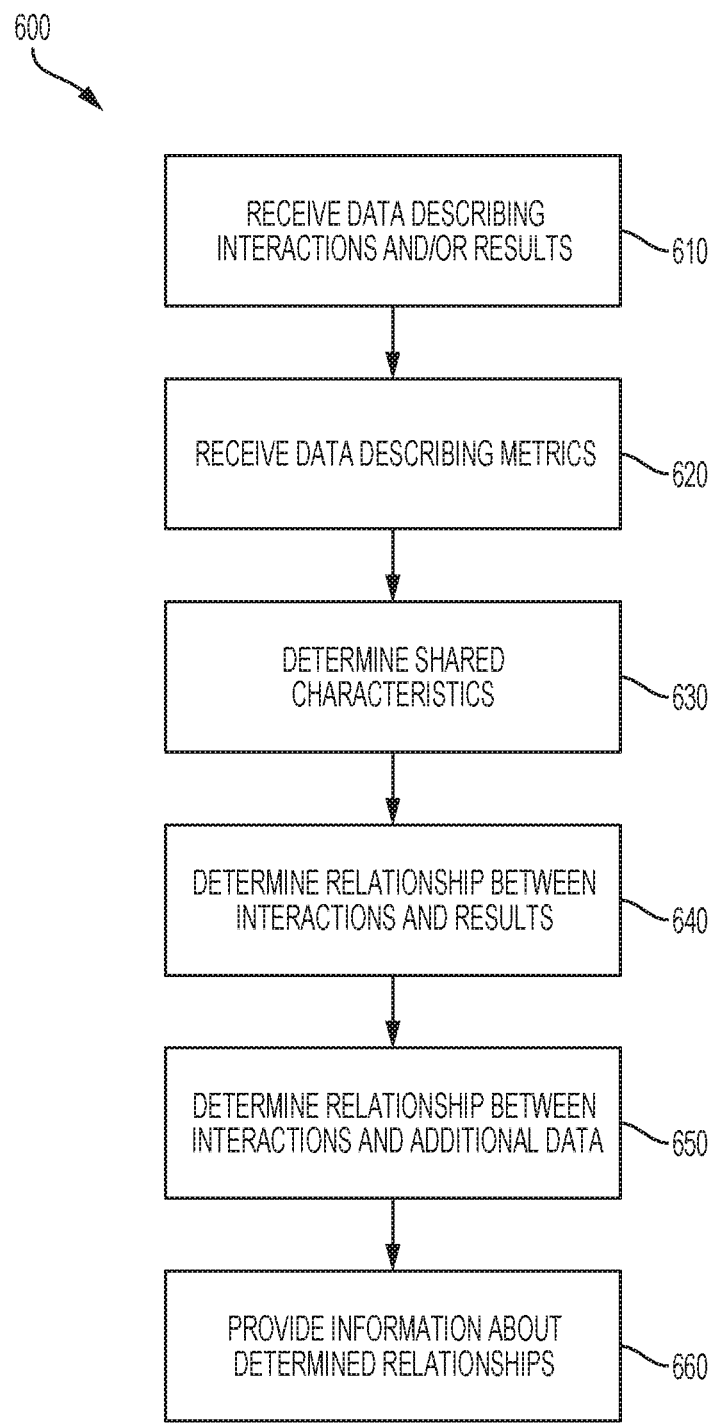
FIG. 6 is a flow chart depicting an example of a process for determining a relationship between user interface ("UI") interactions and results in a VR environment, according to certain embodiments.

FIG. 6 is a flow chart depicting an example of a process 600 for determining a relationship between UI interactions and results. In some embodiments, such as described in regards to FIGS. 1-5, a computing device executing an analysis module implements operations described in FIG. 6, by executing suitable program code. For illustrative purposes, the process 500 is described with reference to the examples depicted in FIGS. 1-5. Other implementations, however, are possible.

At block 610, the process 600 involves receiving data describing interactions with a user interface, or results associated with the interactions, or both. In some cases, the received data could include additional data associated with the described UI interactions. For example, additional data could be received from database 190, as described at least in regards to FIG. 1.

At block 620, the process 600 involves receiving data describing metrics. The described metrics are associated with the UI interactions, the results, or both. In some cases, the described metrics are determined, such as by the analysis module 160. Additionally or alternatively, the described metrics are provided by a suitable source, such as database 190.

At block 630, the process 600 involves identifying characteristics shared by the described UI interactions, or shared by the results, or both. Additionally or alternatively, the identified characteristics are shared by the additional data associated with the UI interactions. In some embodiments, operations related to block 630 are omitted. For example, if received additional data includes shared characteristics, process 600 omits operations related to identifying characteristics.

At block 640, the process 600 involves determining a relationship between the UI interactions and the results. The determined relationship is based on the metrics associated with the UI interactions or the results. Additionally or alternatively, the determined relationship is based on a change in the value of a metric associated with the UI interactions with the results. Additionally or alternatively, the determined relationship is based on the shared characteristics.

At block 650, the process 600 involves determining a relationship between the UI interactions and the additional data associated with the described interactions. The determined relationship is based on shared characteristics of the additional data, as described at least in regards to FIG. 1.

At block 660, the process 600 involves providing information describing the determined relationship. For example, information regarding the determined relationships is provided via a display device configured to display a report, as described in regards to FIGS. 1-5.

Figure 7:
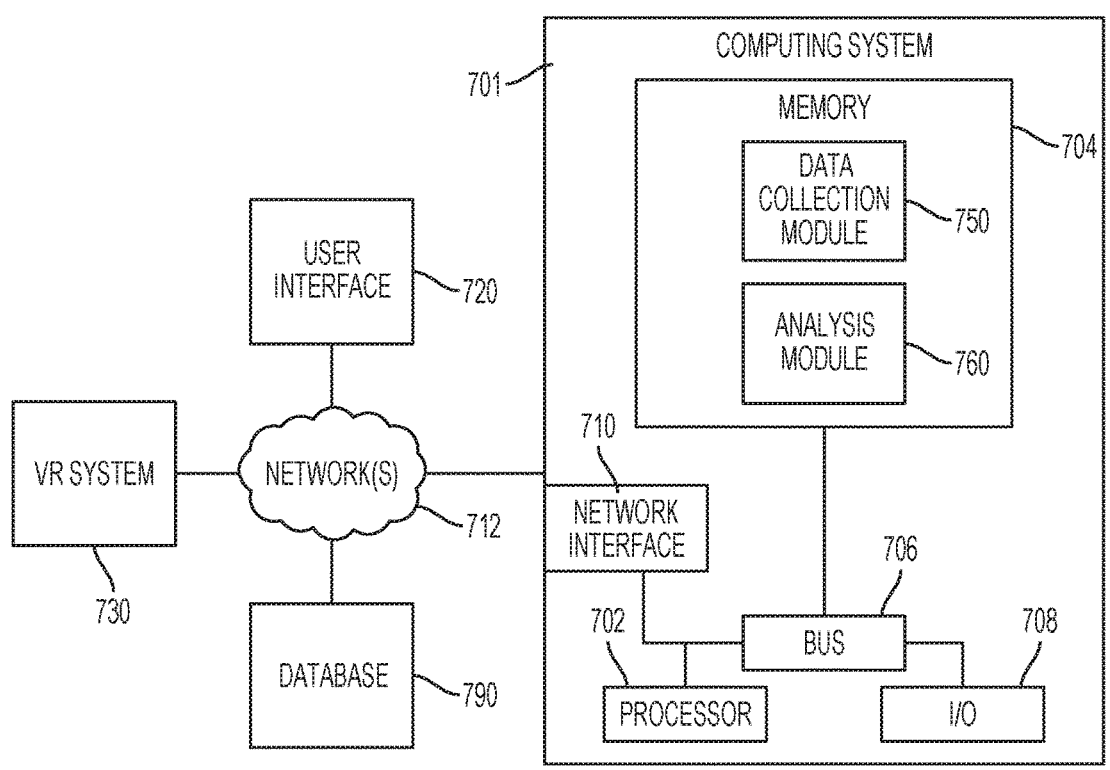
FIG. 7 is a diagram depicting an example of a computing system for implementing a UI analysis system for a VR environment, according to certain embodiments.

Any suitable computing system or group of computing systems can be used for performing the operations described herein. For example, FIG. 7 is a block diagram depicting an example implementation of a computing system 701 for analyzing user interactions with a VR system, according to certain embodiments.

The depicted example of a computing system 701 includes one or more processors 702 communicatively coupled to one or more memory devices 704. The processor 702 executes computer-executable program code or accesses information stored in the memory device 704. Examples of processor 702 include a microprocessor, an application-specific integrated circuit ("ASIC"), a field-programmable gate array ("FPGA"), or other suitable processing device. The processor 702 can include any number of processing devices, including one.

The memory device 704 includes any suitable non-transitory computer-readable medium for storing the analysis module 760, data collection module 750, and other received or determined data. The computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions include processor-specific instructions generated by a compiler or an interpreter from code written in any suitable computer-programming language, including, for example, C, C++, C#, Visual Basic, Java, Python, Perl, JavaScript, and ActionScript.

The computing system 701 also includes a number of external or internal devices such as input or output devices. For example, the computing system 701 is shown with an input/output ("I/O") interface 708 that can receive input from input devices or provide output to output devices. A bus 706 can also be included in the computing system 701. The bus 706 communicatively couples one or more components of the computing system 701.

The computing system 701 executes program code that configures the processor 702 to perform one or more of the operations described above with respect to FIGS. 1-6. The program code includes operations related to, for example, one or more of analysis module 760, data collection module 750, database 790, VR system 730, user interface 720, or other suitable applications or memory structures that perform one or more operations described herein. The program code is resident in the memory device 704 or any suitable computer-readable medium and is executed by the processor 702 or any other suitable processor. In some embodiments, the program code described above, analysis module 760, and data collection module 750, are stored in the memory device 704, as depicted in FIG. 7. In additional or alternative embodiments (not depicted in FIG. 7), the program code or other components is stored elsewhere. For example, data collection module 750 is included in VR system 730. In additional or alternative embodiments, one or more of the analysis module 760, data collection module 750, VR system 730, user interface 720, and the program code described above are stored in one or more memory devices accessible via a data network, such as a memory device accessible via a cloud service.

The computing system 701 depicted in FIG. 7 also includes at least one network interface 709. The network interface 709 includes any device or group of devices suitable for establishing a wired or wireless data connection to one or more data networks 712. Non-limiting examples of the network interface 709 include an Ethernet network adapter, a modem, and/or the like. The computing system 701 is able to communicate with one or more of the VR system 730, user interface 720, and the database 790 using the network interface 709.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A method of facilitating analysis of user interface interactions within a virtual reality environment, the method comprising:
    receiving, via a processing device, data describing an interaction with a user interface (UI) of an application, the UI implemented within a virtual reality (VR) environment, wherein the described UI interaction comprises a gesture, a spatial context, and an application context;
    receiving, via the processing device, data describing a result, wherein the described result is associated with a response of the application to the described UI interaction, and the described result is associated with one or more of: the gesture, the spatial context, or the application context;
    determining a group of correlated UI interactions, the group including the described UI interaction and at least one additional UI interaction described in stored data, wherein the additional UI interaction comprises a historical UI interaction with the UI of the application, wherein each UI interaction in the group is correlated with a respective result associated with the response of the application;
    determining, by the processing device, a relationship between the described result, the described UI interaction, and the at least one additional UI interaction, wherein determining the relationship includes determining that the at least one additional UI interaction shares a characteristic with the described UI interaction; and
    providing, via the processing device, the determined relationship between the described result, the described UI interaction, and the at least one additional UI interaction.

2. The method of claim 1, wherein the shared characteristic includes one or more of:
    the gesture of the described UI interaction, wherein the gesture is related to an additional gesture of the additional UI interaction,
    the spatial context of the described UI interaction, wherein the spatial context is related to an additional spatial context of the additional UI interaction, or
    the application context of the described UI interaction, wherein the application context is related to an additional application context of the additional UI interaction.

3. The method of claim 1, wherein analyzing the described UI interaction and the at least one additional UI interaction includes determining a metric based on the one or more of: the gesture, the spatial context, or the application context of the described UI interaction.

4. The method of claim 3, wherein determining the relationship between the described result, the described UI interaction, and the at least one additional UI interaction includes determining that the shared characteristic is correlated with a change in a value of the metric.

5. The method of claim 1, further comprising receiving multiple additional UI interactions and multiple additional results associated with respective ones of the multiple additional UI interactions, wherein:
    analyzing the described UI interaction and the at least one additional UI interaction includes determining that the multiple additional UI interactions share an additional characteristic that is not shared by the described UI interaction, and
    determining the relationship between the described result, the described UI interaction, and the at least one additional UI interactions includes determining that the multiple additional results are different from the described result.

6. The method of claim 1, wherein analyzing the described UI interaction and the at least one additional UI interaction includes determining an event based on the described UI interaction.

7. The method of claim 6, wherein the determined event is identified as a new event, based on a comparison to a library.

8. A non-transitory computer-readable medium embodying program code for facilitating analysis of user interface interactions within a virtual reality environment, the program code comprising instructions which, when executed by a processor, cause the processor to perform operations comprising:
    receiving data describing an interaction with a user interface (UI) of an application, the UI implemented within a virtual reality (VR) environment, wherein the described UI interaction comprises a gesture, a spatial context, and an application context;
    receiving data describing a result, wherein the described result is associated with a response of the application to the described UI interaction, and the described result is associated with one or more of: the gesture, the spatial context, or the application context;

determining a relationship between the described result, the described UI interaction, and at least one additional UI interaction described in stored data, wherein the additional UI interaction comprises a historical UI interaction with the UI of the application, wherein determining the relationship includes determining that the at least one additional UI interaction shares a characteristic with the described UI interaction; and configuring a display device to present the determined relationship between the described result, the described UI interaction, and the at least one additional UI interaction.

9. The non-transitory computer-readable medium of claim 8, wherein the shared characteristic includes one or more of:

the gesture of the described UI interaction, wherein the gesture is related to an additional gesture of the additional UI interaction, the spatial context of the described UI interaction, wherein the spatial context is related to an additional spatial context of the additional UI interaction, or the application context of the described UI interaction, wherein the application context is related to an additional application context of the additional UI interaction.

10. The non-transitory computer-readable medium of claim 8, wherein analyzing the described UI interaction and the at least one additional UI interaction includes determining a metric based on the one or more of: the gesture, the spatial context, or the application context of the described UI interaction.

11. The non-transitory computer-readable medium of claim 10, wherein determining the relationship between the described result, the described UI interaction, and the at least one additional UI interaction includes determining that the shared characteristic is correlated with a change in a value of the metric.

12. The non-transitory computer-readable medium of claim 8, the operations further comprising receiving multiple additional UI interactions and multiple additional results associated with respective ones of the multiple additional UI interactions, wherein:

analyzing the described UI interaction and the at least one additional UI interaction includes determining that the multiple additional UI interactions share an additional characteristic that is not shared by the described UI interaction, and determining the relationship between the described result, the described UI interaction, and the at least one additional UI interactions includes determining that the multiple additional results are different from the described result.

13. The non-transitory computer-readable medium of claim 8, wherein analyzing the described UI interaction and the at least one additional UI interaction includes determining an event based on the described UI interaction.

14. The non-transitory computer-readable medium of claim 13, wherein the determined event is identified as a new event based on a comparison to a library.

15. A system for facilitating analysis of user interface interactions within a virtual reality environment, the system comprising:

a means for receiving data describing an interaction with a user interface (UI) of an application, the UI implemented within a virtual reality (VR) environment, wherein the described UI interaction comprises a gesture, a spatial context, and an application context;

a means for receiving data describing a result, wherein the described result is associated with a response of the application to the described UI interaction, and the described result is associated with one or more of: the gesture, the spatial context, or the application context;

a means for determining a relationship between the described result, the described UI interaction, and at least one additional UI interaction described in stored data, wherein the additional UI interaction comprises a historical UI interaction with the UI of the application, wherein determining the relationship includes determining that the at least one additional UI interaction shares a characteristic with the described UI interaction; and a means for providing the determined relationship between the described result, the described UI interaction, and the at least one additional UI interaction.

16. The system of claim 15, wherein the means for analyzing the described UI interaction and the at least one additional UI interaction includes determining a metric based on the one or more of: the gesture, the spatial context, or the application context of the described UI interaction.

17. The system of claim 16, wherein the means for determining the relationship between the described result, the described UI interaction, and the at least one additional UI interaction includes determining that the shared characteristic is correlated with a change in a value of the metric.

18. The system of claim 15, further comprising a means for receiving multiple additional UI interactions and multiple additional results associated with respective ones of the multiple additional UI interactions, wherein:

the means for analyzing the described UI interaction and the at least one additional UI interaction includes determining that the multiple additional UI interactions share an additional characteristic that is not shared by the described UI interaction, and the means for determining the relationship between the described result, the described UI interaction, and the at least one additional UI interactions includes determining that the multiple additional results are different from the described result.

19. The system of claim 15, wherein the means for analyzing the described UI interaction and the at least one additional UI interaction includes determining an event based on the described UI interaction.

20. The system of claim 19, wherein the determined event is identified as a new event, based on a comparison to a library.

* * * * *